United States Patent [19]

Albright

[11] 4,053,005
[45] Oct. 11, 1977

[54] METHOD OF HARVESTING TREES

[76] Inventor: Alva Z. Albright, 2909 Monroe Highway, Pineville, La. 71360

[21] Appl. No.: 520,823

[22] Filed: Nov. 4, 1974

[51] Int. Cl.² .......................................... A01G 23/02
[52] U.S. Cl. ............................ 144/309 AC; 144/3 D;
144/34 R; 83/928
[58] Field of Search ............ 144/309 AC, 34 R, 34 E, 144/3 D

[56] References Cited

U.S. PATENT DOCUMENTS

| 1,101,899 | 6/1914 | Betten | 144/34 R |
|---|---|---|---|
| 3,074,447 | 1/1963 | Bombardier | 144/34 R |
| 3,102,562 | 9/1963 | Horncastle | 144/3 RR |
| 3,885,610 | 5/1975 | Forslund et al. | 144/34 R |

*Primary Examiner*—Donald R. Schran
*Attorney, Agent, or Firm*—James B. Lake, Jr.

[57] ABSTRACT

A method of harvesting trees, by engaging separately between a pair of jaws adapted to pivotally open and close, the jaws having vertically spaced, tree-engaging double edges; by cutting the engaged tree between the double edges, the cut tree being held in place by the pair of jaws bridging the cut; by felling the cut tree in a desired direction toward which the jaws were tilted, the edges of the tree stump chipping away to free the sharp edges engaged therewith without releasing the jaws from the tree trunk; and by bunching the cut tree with others before releasing said jaws.

1 Claim, 2 Drawing Figures

METHOD OF HARVESTING TREES

BACKGROUND OF THE INVENTION

1. Field of the Invention

The invention relates generally to an improved method of harvesting trees and more particularly to cutting, felling and bunching trees.

2. Description of the Prior Art

This application covers claims made the requirement of restriction in my original patent application filed 12/20/71 for "Tree Cutting And Handling Apparatus" and patented 03/12/74 U.S. Pat. No. 3,796,242.

SUMMARY OF THE INVENTION

Figure 1:
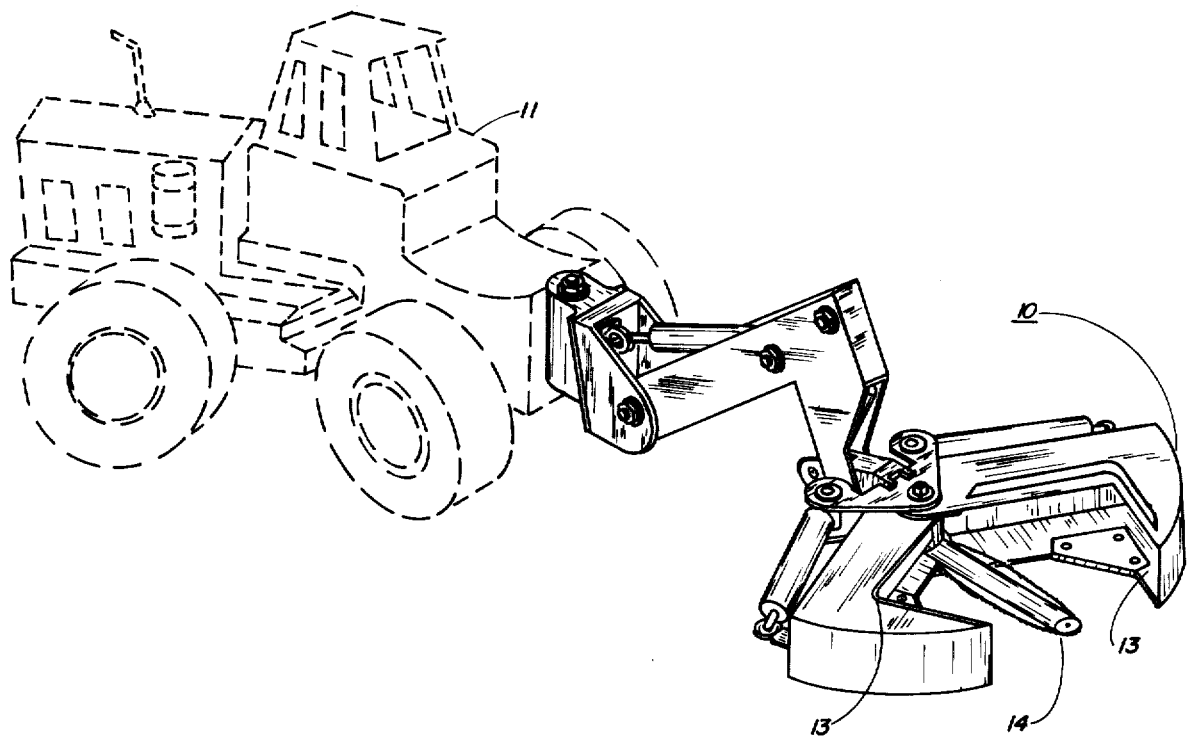
FIG. 1 is a three dimensional view of apparatus that could be used to carry out the method of the invention.
Figure 2:
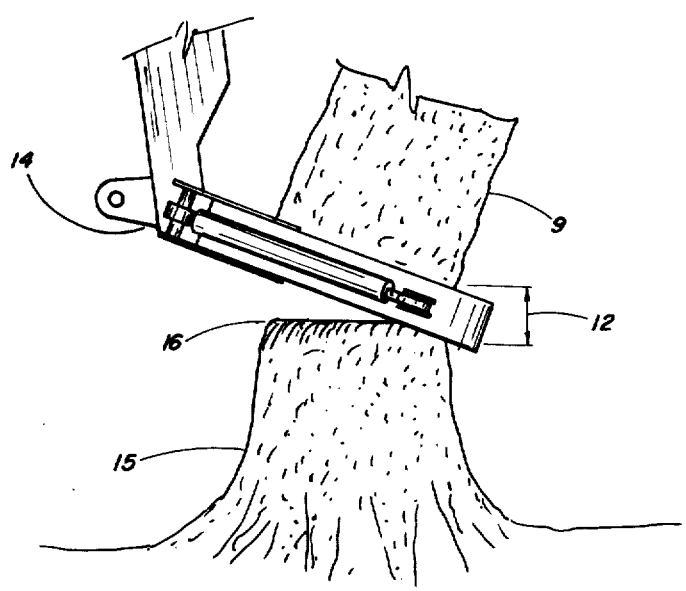
FIG. 2 is a three dimensional view in a middle phase of the method of the invention partially showing apparatus and an object used.

In harvesting trees it is desirable that the cutting means be held in a cutting alignment with the tree and maintained therewith, and that the tree remain stationary until the cutting is completed and then directed to fall in a desired direction and bunched with others with the least handling.

It is an object of the invention to provide an improved method of engaging, cutting and bunching a tree with pre-aligned cutting and engaging means.

DETAIL DESCRIPTION

Referring to the drawings, the method of the invention comprises engaging a tree 9 between a pair of double- edged jaws 10 adapted to pivotally open and close and which are operably mounted on a power train 11 of any of several well-known types. A tree holding area 12 is defined by the double edged jaws having vertically spaced apart sharp edges 13. Cutting the tree within the cutting area between the jaws and their sharp edges, preferably with a chain saw 14 that is pivoted to cut, in common with the jaws to close, and are thereby pre-aligned. Holding the tree in its original position during the completion of the cutting by the vertically spaced sharp edges 13 of the jaws 10 which respectively engage the fixed tree stump 15 and the severed tree trunk. Tilting the jaws to break away the edges 16 of the stump 15 and fell the tree in the desired direction of tilting without releasing the sharp edges engaging the trunk. And bunching the cut tree, with others by moving the power train to a bunching site and then releasing the jaws and the tree with the least handling.

What is claimed is:

1. An improved method of harvesting trees comprising the steps of:
   a. Engaging a tree between a pair of double-edged jaws adapted to pivotally open and close and being mounted on a power train, said double edges of each said jaw being vertically spaced apart and defining limits of cutting;
   b. Cutting said tree between said jaws and within said cutting limits with a chain saw pivoting to cut on a common pivot with said jaws opening and closing;
   c. Holding said tree between said jaws in original position during cutting, said double dges respectively engaging the stump and the the trunk of said tree with the cut therebetween;
   d. Felling said tree trunk by tilting said jaws in a desired direction of fall, the sharp edges engaging said stump chipping free therefrom, and the sharp edges engaging said tree trunk remaining engaged therewith; and
   e. Bunching said tree trunk by moving said power train and releasing said jaws and their sharp edges engaging said trunk.

* * * * *